(12) United States Patent
Jensen

(10) Patent No.: US 12,392,655 B2
(45) Date of Patent: Aug. 19, 2025

(54) MATERIALS AND METHODS OF DETERMINING THE AMOUNT OF VOLATILE SOLVENTS IN TEETH WHITENING COMPOSITIONS

(71) Applicant: CAO Group, Inc., West Jordan, UT (US)

(72) Inventor: Steven D Jensen, South Jordan, UT (US)

(73) Assignee: CAO Group, Inc., West Jordan, UT (US)

( * ) Notice: Subject to any disclaimer, the term of this patent is extended or adjusted under 35 U.S.C. 154(b) by 444 days.

(21) Appl. No.: 18/059,865

(22) Filed: Nov. 29, 2022

(65) Prior Publication Data

US 2024/0175742 A1    May 30, 2024

(51) Int. Cl.
*G01G 17/04*    (2006.01)

(52) U.S. Cl.
CPC ................... *G01G 17/04* (2013.01)

(58) Field of Classification Search
CPC ..................................................... G01G 17/04
USPC ............................................................ 177/1
See application file for complete search history.

(56) References Cited

U.S. PATENT DOCUMENTS

| | | | | |
|---|---|---|---|---|
| 6,221,341 B1* | 4/2001 | Montgomery | ......... | A61K 8/731 424/53 |
| 6,312,666 B1* | 11/2001 | Oxman | ................... | A61K 8/02 424/53 |
| 8,377,423 B2* | 2/2013 | Speronello | ............... | A61K 8/20 424/661 |
| 2015/0342839 A1* | 12/2015 | Montgomery | ......... | A61K 8/731 424/78.35 |
| 2017/0340532 A1* | 11/2017 | Montgomery | ....... | A61C 19/003 |

* cited by examiner

*Primary Examiner* — Jacques M Saint Surin
(74) *Attorney, Agent, or Firm* — Dobbin IP Law, P.C.; Geoffrey E. Dobbin

(57) ABSTRACT

A method of accurately and precisely measuring the volatile solvent content of tooth whitening compounds incorporates taking a representative sample of the compound at a given stage of manufacture and measuring its weight before and after a heating process to eliminate substantially all the volatile solvents contained within the sample. By comparing initial and finished weights, the percentage of volatile solvents may be obtained. The process may then be repeated throughout the manufacturing process until any desired solvent concentration is reached.

5 Claims, 1 Drawing Sheet

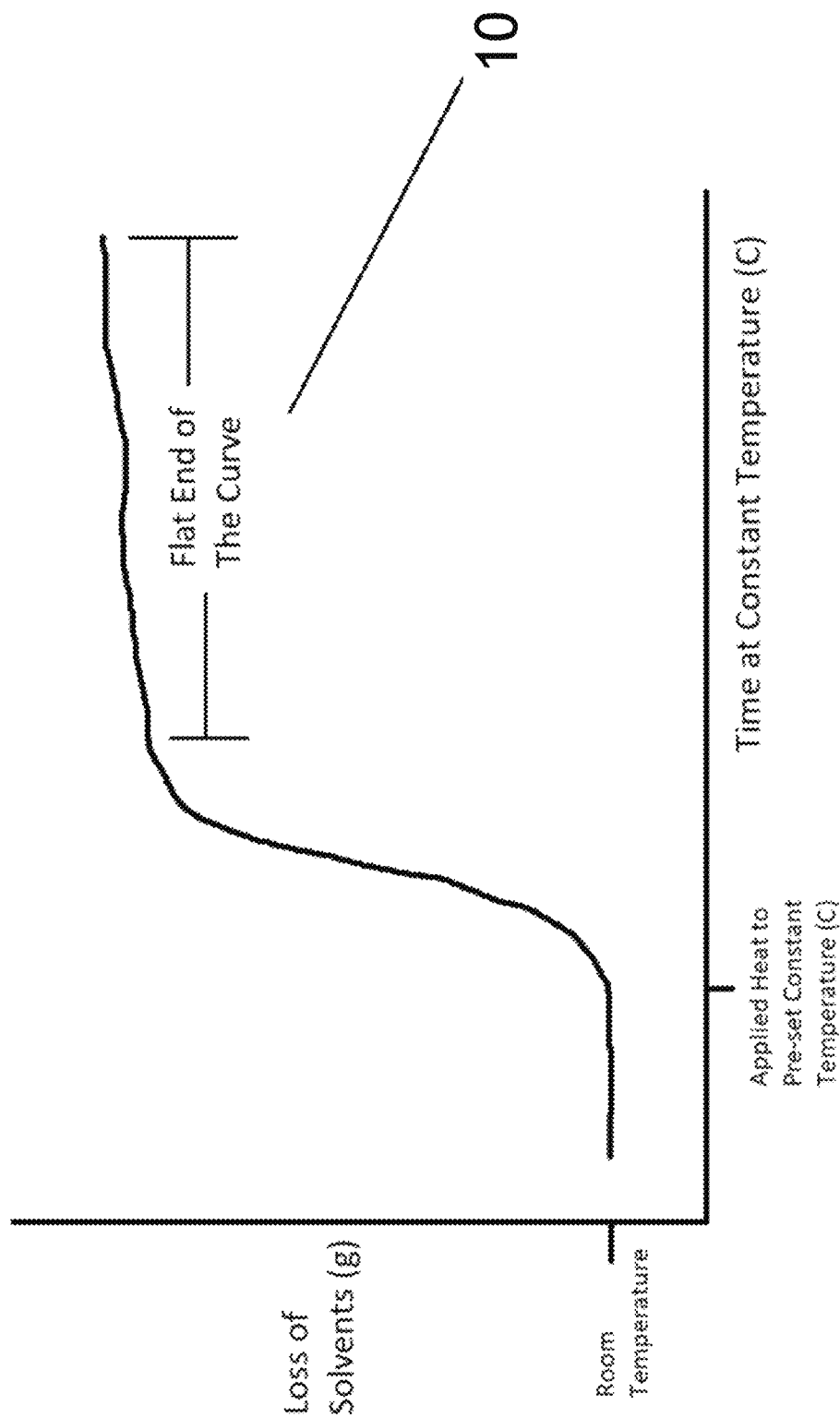

MATERIALS AND METHODS OF DETERMINING THE AMOUNT OF VOLATILE SOLVENTS IN TEETH WHITENING COMPOSITIONS

FIELD OF THE INVENTION

The present invention relates to the field of dentistry and more particularly relates to a method and system of quality control for tooth whitening compositions.

BACKGROUND OF THE INVENTION

When manufacturing teeth whitening products, there is a need to know the amount of volatile solvents that remain in the product as it moves through the various manufacturing procedures to a final product, especially if the process includes processes such as heating the composition, air drying, hot air drying, forced air drying, heated forced air drying and other processes that potentially alter the volatile solvent concentration.

The most common volatile solvents in whitening compositions are usually water and ethanol. These solvents readily evaporate at room temperature and even more so as the temperature increases. Since these volatile solvents evaporate during the manufacturing process, they must be measured, monitored, and accounted for if a reproducible final product is to be obtained.

There are non-volatile solvents which are intended to remain in the tooth whitening composition after manufacture. These solvents include glycerin, with a boiling point of 290 C (554° F.), PEG 200, with a boiling point of >200 C (392° F.), propylene glycol, with a boiling point of 188 C (370.4° F.), and other non-volatile solvents. The manufacturing process usually never subjects the composition to sufficiently high temperatures where significant loss of these solvents is an issue.

The characteristics of water and ethanol make them ideal for solvents which are intended to be removed from a final composition. Water has a boiling point of 100 C (212° F.), and ethanol has a boiling point of 78 C (172.4° F.). Furthermore, both have high vapor pressures as volatile solvents have higher vapor pressures than their non-volatile solvent counterparts. Vapor pressure is usually reported as a measure of atmospheres or Pascals (Pa) at a given temperature, as temperature affects vapor pressure. Liquids boil when their vapor pressure exceeds the surrounding pressure (thus why water boils at lower temperatures at higher elevations) and liquids with higher vapor pressures boil and evaporate more readily. For example, water has a vapor pressure of 2300 Pa and ethanol 5830 Pa at 20 C (68° F.) whereas glycerin has a vapor pressure of 0.4 Pa at 50 C (122° F.) and propylene glycol has a vapor pressure of 11 Pa at 20 C. Therefore, water has a vapor pressure 209 times greater than propylene glycol at 20 C.

The control of temperature and volatile solvent concentration is imperative for teeth whitening compositions that require heat during manufacturing. Many whitening compounds are inherently unstable and decompose rapidly as the temperature rises. For example, peroxide whitening compounds are very unstable and will even decompose upon storage at room temperatures. Prolonged exposure of Peroxide compounds to high temperature environments will cause these compounds to decompose completely into water and oxygen. As such, prolonged exposure to temperatures above 70 C. (158° F.) are disastrous for peroxide compounds. Therefore, in-process manufacturing requires the lowest possible temperatures with the least amount of time in those elevated temperatures. This heat related decomposition phenomenon which is inherent with teeth whitening compounds greatly restricts the amount of volatile solvents that can be evaporated if the process includes processes such as heating the composition, air drying, hot air drying, forced air drying, heated forced air drying and other process that potentially alter the volatile solvent concentration.

Other manufacturing process embodiments separate the temperature sensitive teeth whitening compounds from the other ingredients and process the composition initially without such whitening compounds in order that higher temperatures can be utilized during manufacturing. Then, at a later stage, the unstable whitening compounds are added when higher temperatures are no longer needed.

In some applications it is imperative to precisely know the amount of volatile solvents present in the whitening composition to have a final product that is consistent when batch after batch is manufactured. It is also imperative to know the amount of volatile solvents in a whitening composition while in-process so that the manufacturing parameters can be controlled such that when the whitening device reaches the final stage it has the correct amount of volatile solvents, and if it does not the batch can be quarantined.

The present invention is a method of measuring the amount of volatile solvents in a sample of a compound, at varying stages of the manufacturing process. The present invention represents a departure from the prior art in that the method of the present invention allows for precise monitoring of the volatile solvents in a compound, including and up to the finished product.

SUMMARY OF THE INVENTION

An improved quality control method may provide a system and methodology for determining the concentration of volatile solvents present in a compound which meets the following objectives: that it is simple and effective to implement, that it provides accurate results quickly, and that it is inexpensive and unobtrusive to implement. As such, a new and improved quality control methodology may comprise taking uniform samples of a product at specified stages of its manufacture and boiling out the volatile solvents for pre- and post-evaporation weight comparison to accomplish these objectives.

The more important features of the invention have thus been outlined in order that the more detailed description that follows may be better understood and in order that the present contribution to the art may better be appreciated. Additional features of the invention will be described hereinafter and will form the subject matter of the claims that follow.

Many objects of this invention will appear from the following description and appended claims, reference being made to the accompanying drawings forming a part of this specification wherein like reference characters designate corresponding parts in the several views.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also, it is to be understood that the phraseology and terminology employed herein are for description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

In order to describe the manner in which the above-recited and other advantages and features of the invention can be obtained, a more particular description of the invention briefly described above will be rendered by reference to specific example embodiments thereof which are illustrated in the appended drawings. Understanding that these drawings depict only typical embodiments of the invention and are therefore not to be considered as limiting of its scope, the invention will be described and explained with additional specificity and detail using the accompanying drawings.

FIG. 1 is an exemplary S-curve plot of solvent loss over time.

DESCRIPTION

With reference now to the drawings, a preferred embodiment of the Method for Determining the Amount of Volatile Solvents in Teeth Whitening Compositions is herein described. It should be noted that the articles "a," "an," and "the," as used in this specification, include plural referents unless the content clearly dictates otherwise.

Teeth whitening compositions are usually designed to be utilized by the patient at room temperature until it is placed in the mouth at around 37 C (98.6° F.). This Specification defines volatile solvents within whitening compositions to be any ingredient that by itself is a fluid at 20 C-37 C at 1 atmosphere pressure, and with a boiling point below 170 C. So, for example, water by itself is a fluid between 20 C-37 C and has a boiling point of 100 C, therefore it is classified as a volatile solvent.

Portions of the whitening composition that are classified as non-solvents are usually those ingredients that tend to initiate combustion (burn) before reaching their boiling point when heated slowly. Volatile solvents on the other hand will tend to boil upon reaching their boiling point and evaporate when heated slowly. Non-solvents are usually polymer thickeners like PVP, polyethyl oxazoline, carbopol, polyvinyl alcohol, xanthan gum, and any other useful thickener. These polymer thickeners are usually blended with solvents, flavors, sweeteners, and a tooth whitening compound to form a fluidic gel that can be applied to a backing layer or a backing device while in a fluid state. The backing device or backing layer can be further dried so that the fluid composition becomes substantially solid and becomes more fixed in place against the backing. In some embodiments, the whitening composition requires no backing material or backing device as the whitening composition alone is the teeth whitening appliance that is placed on the teeth.

The present invention utilizes a precise weighing balance together with a programmable heating apparatus that can be pre-set to maintain a constant temperature. A whitening composition sample is weighed, and the sample weight recorded (Initial Weight). Thereafter, the sample is zeroed upon the weighing balance and subsequently heated by the heating apparatus until the temperature matches the temperature value of the pre-set. The pre-set value is of sufficient heat and temperature to evaporate the volatile solvents within the whitening composition and should not exceed 170 C. As the solvents evaporate the weighing balance will measure the loss of solvents over the course of time. The data produces an S-curve when the loss of solvents by weight is plotted against time, like that shown in FIG. 1. In FIG. 1 a generic S-curve plots of loss of solvents vs. time. The baseline, or initial temperature, is room temperature and time zero begins after the product sample has been zeroed on the weighing balance. When the values of Time vs. Loss of Solvent are being recorded (live), the heating apparatus is then initiated, and the sample is then allowed to heat up to the pre-set temperature. Most of the volatile solvents will evaporate after the heat is initially applied, creating a steep slope that will level out as smaller amounts of volatile solvents remain. The S-Curve will then crest as the volatile solvents become substantially exhausted wherein it forms the flat end of the curve (A). At elevated temperatures, there is a point where all the volatile solvents have evaporated and further heating only serves to decompose the remaining ingredients, which will also register as a loss of solvents. Therefore, to minimize the loss of weight from decomposition products, measurement at the flat end of the curve (A) is allowed to continue for only 2 minutes and immediately thereafter the final weight is recorded. This provides a standardized stopping point. While it is preferred to have the final recorded weight to be 2 minutes after the slope of the curve no longer decreases, other time frames may be utilized. The amount of volatile solvent within the whitening composition is then calculated:

$$\frac{\text{Final Whitening Composition Weight (g)}}{\text{Initial Whitening Composition Weight (g)}} \times 100 = \% \text{ Volatile Solvents}$$

Utilizing this method an analyst can determine the percentage of volatile solvents in the compound at any time during the manufacturing process and, if possible, the process may proceed only when the results are known. This allows the technician to adjust in-process parameters accordingly so that the final product meets specifications, especially if the process includes processes such as heating the composition, air drying, hot air drying, forced air drying, heated forced air drying and other processes that potentially alter the volatile solvent concentration. Once final specifications are reached, the product may be placed in a sealed environment, such as a water-impervious barrier, to minimize further evaporation.

The ability to measure the amount of volatile solvent within a tooth whitening composition provides a means to create custom teeth whitening compositions that contain precise concentrations of solvents. This allows favorable characteristics to be customized that would be improbable to achieve by the prior art.

An embodiment of the present invention comprises teeth whitening compositions that are initially in a base fluid state and are then subsequently dried into a substantially solid state, especially if the process includes processes such as heating the composition, air drying, hot air drying, forced air drying, heated forced air drying and other processes that potentially alter the volatile solvent concentration. By practicing the present invention, it is possible to manufacture teeth whitening compositions with any physical state between a fluid and a dry solid. Therefore, various other physical states are possible such as elastic states, deformable solid states, thixotropic states, or other states where the coefficients of viscosity and states of elasticity are numerous. Teeth whitening compositions that contain precise amounts of solvents can be tailored to produce very specific physical characteristics that are virtually unachievable by the prior art. These embodiments include narrow ranges of volatile solvents wherein the percentage volatile solvents range between 16%-17%; other embodiments comprise ranges between 17%-18%, 15%-16%, 18%-19%, 14%-15%, 19%-20%, 13%-14%, 20%-21%, 12%-13%, 11%-12%, 11%-10%, 10%-9% and other narrow ranges of volatile solvents.

Although the present invention has been described with reference to preferred embodiments, numerous modifications and variations can be made and still the result will come within the scope of the invention. The embodiments described are to be considered in all respects only as illustrative and not restrictive. No limitation with respect to the specific embodiments disclosed herein is intended or should be inferred. Therefore, the scope of the invention is indicated by the appended claims rather than by the foregoing description. All changes which come within the meaning and range of equivalency of the claims are to be embraced within their scope.

What is claimed is:

1. A method of measuring volatile solvents within teeth whitening compositions comprising:
    an initial step of weighing a unit sample of a teeth whitening composition on a weighing balance to record an initial weight
    a subsequent step of zeroing the unit sample on the weighing balance;
    a further step of uniformly heating the unit sample to a temperature that significantly increases the evaporation rate of volatile solvents within the teeth whitening composition;
    maintaining the temperature at a pre-determined value, such that the temperature remains substantially consistent while thermal equilibrium is reached over the course of the analysis; and,
    monitoring the weighing balance to determine when predominately all the volatile solvents have evaporated and recording a final weight.

2. The method of claim 1, wherein the weights measured from the weighing balance are compared to an evaporation S-curve.

3. A method of manufacturing a tooth whitening composition with a custom amount of volatile solvents comprising:
    manufacturing a tooth whitening composition base with known quantities of ingredients, where at least one of the ingredients is a volatile solvent;
    a subsequent step of allowing the volatile solvent within the teeth whitening composition base to evaporate;
    a further step of measuring an amount of volatile solvent within the teeth whitening composition until a custom amount of volatile solvent is obtained, wherein there is an overall loss of volatile solvents within the teeth whitening composition; and,
    a final step of enclosing the teeth whitening composition to minimize further evaporation.

4. The method of claim 1, the at least one volatile solvent being selected from the list of volatile solvents consisting of water and ethanol.

5. The method of claim 1, the custom amount of volatile solvent in the teeth whitening composition being within a range of 9-21% of the final teeth whitening composition by weight.

* * * * *